US011507671B1

(12) United States Patent
Moritz et al.

(10) Patent No.: US 11,507,671 B1
(45) Date of Patent: *Nov. 22, 2022

(54) DETECTION AND HEALING OF VULNERABILITIES IN COMPUTER CODE

(71) Applicant: BlueRISC, Inc., Amherst, MA (US)

(72) Inventors: Csaba Andras Moritz, Amherst, MA (US); Kristopher Carver, Belchertown, MA (US); Jeffry Gummeson, Hadley, MA (US)

(73) Assignee: BLUERISC, INC., Amherst, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/941,853

(22) Filed: Jul. 29, 2020

Related U.S. Application Data

(63) Continuation of application No. 16/272,405, filed on Feb. 11, 2019, now Pat. No. 10,839,085, which is a continuation of application No. 15/674,084, filed on Aug. 10, 2017, now Pat. No. 10,248,792, which is a continuation of application No. 14/551,341, filed on Nov. 24, 2014, now Pat. No. 9,754,112.

(51) Int. Cl.
*G06F 21/57* (2013.01)
*G06F 21/54* (2013.01)

(52) U.S. Cl.
CPC ............ *G06F 21/577* (2013.01); *G06F 21/54* (2013.01); *G06F 2221/033* (2013.01)

(58) Field of Classification Search
CPC ... G06F 21/577; G06F 21/54; G06F 2221/033
USPC ........................................................ 726/25
See application file for complete search history.

(56) References Cited

U.S. PATENT DOCUMENTS

| | | |
|---|---|---|
| 6,609,201 B1 | 8/2003 | Folmsbee |
| 6,970,985 B2 | 11/2005 | Moritz |
| 7,284,274 B1 | 10/2007 | Walls et al. |
| 7,493,607 B2 | 2/2009 | Moritz |
| 7,996,671 B2 | 8/2011 | Chheda et al. |
| 8,327,249 B2 * | 12/2012 | Jorda .................... H03M 13/09 714/800 |
| 8,600,718 B1 | 12/2013 | Stepaniants et al. |
| 8,607,209 B2 | 12/2013 | Chheda et al. |
| 9,411,964 B1 | 8/2016 | Moritz et al. |
| 9,569,612 B2 | 2/2017 | Wilkerson et al. |
| 9,754,112 B1 | 9/2017 | Moritz et al. |
| 10,248,792 B1 | 4/2019 | Moritz et al. |
| 2005/0114850 A1 | 5/2005 | Chheda et al. |
| 2007/0044153 A1* | 2/2007 | Schuba ............... H04L 63/1433 726/24 |
| 2007/0074169 A1 | 3/2007 | Chess et al. |
| 2007/0294181 A1 | 12/2007 | Chheda et al. |
| 2008/0034355 A1 | 2/2008 | Shen et al. |
| 2008/0126768 A1 | 5/2008 | Chheda et al. |
| 2008/0278227 A1 | 11/2008 | Greifeneder |
| 2009/0282480 A1* | 11/2009 | Lee ......................... G06F 21/52 726/22 |
| 2011/0126288 A1 | 5/2011 | Schloegel et al. |
| 2013/0205285 A1 | 8/2013 | Pizlo |
| 2014/0181980 A1 | 6/2014 | Christodorescu et al. |
| 2014/0283040 A1 | 9/2014 | Wilkerson et al. |
| 2015/0293896 A1 | 10/2015 | Runkis et al. |
| 2015/0363598 A1 | 12/2015 | Xu et al. |
| 2016/0224789 A1 | 8/2016 | Feroz et al. |
| 2018/0032441 A1* | 2/2018 | De ...................... G06F 11/3612 |
| 2018/0046562 A1 | 2/2018 | Jang et al. |

OTHER PUBLICATIONS

Non-Final Office Action for U.S. Appl. No. 15/193,935, 29 pages, (dated Sep. 4, 2020).
File History of U.S. Appl. No. 15/674,084 (downloaded Oct. 28, 2019) (269 pages).
Rawat (Finding Buffer Overflow Inducing Loops in Binary Executables, Retrieved from https://ieeexplore.ieee.org/stamp/stamp.jsp? tp=&arnumber=6258307 2012) (Year: 2012).
File History of U.S. Appl. No. 15/193,935 (downloaded Oct. 28, 2019) (398 pages).
Aho, A. V. et al., Compilers—Principles, Techniques, and Tools; Addison-Wesley, Reading, MA (1986).
Alternative to Itoa() for converting integer to string C++?, 8 pages (Oct. 23, 2008). URL: http://stackoverflow.com/questions/228005/alternative-to-itoa-for-converting-integer-to-string-c [Retrieved Jun. 21, 2016].

(Continued)

*Primary Examiner* — Jacob Lipman
(74) *Attorney, Agent, or Firm* — Burns & Levinson LLP

(57) ABSTRACT

An example process includes: identifying, by one or more processing devices, candidate code in executable code based on a static analysis of the executable code, where the candidate code includes code that is vulnerable to attack or the candidate code being on a path to code that is vulnerable to attack, where information related to the attack is based, at least in part, on the candidate code; customizing, by one or more processing devices, a healing template based on the information to produce a customized healing template; and inserting, by one or more processing devices, the customized healing template into a version of the executable code at a location that is based on a location of the candidate code in the executable code, where the customized healing template includes code that is executable to inhibit the attack.

21 Claims, 10 Drawing Sheets

(56) References Cited

OTHER PUBLICATIONS

Anderson, R. and Kuhn, M., Tamper Resistance—A Cautionary Note, Proceedings of Second USENIX Workshop on Electronic Commerce, (1996).

Brumley, D. et al., Sting: An End-to-End Self-Healing System for Defending against internet Worms, 31 pages (Nov. 2005). URL: http://www.cs.berkeley.edu/~dawnsong/papers/2007%20sting-bookchapter-06.pdf [Retrieved Feb. 19, 2016].

Coppola, M., Owning the Network: Adventures in Router Rootkits, Virtual Security Research, LLC. (2012).

Cui, A. and Stolfo, S., Defending Legacy Embedded Systems with Software Symbiotes, The 14th International Symposium on Recent Advances in Intrusion Detection (RAID), 358-377 (2011).

Department of Homeland Security, Critical Infrastructure Sectors, 4 pages (2016). URL: http://www.dhs.gov/criticalinfrastructure-sectors [Retrieved Jun. 21, 2016].

Diskin, G., Binary Instrumentation for Security Professionals, Intel, Blackhat USA (2011).

File History for U.S. Appl. No. 15/193,935, 205 pages (retrieved Jan. 16, 2019).

File History of U.S. Appl. No. 14/551,341, 201 pages (Retrieved Jul. 11, 2017).

File History of U.S. Appl. No. 14/551,341, filed Nov. 24, 2014 (Retrieved Jan. 30, 2017).

File History of U.S. Appl. No. 14/551,508, filed Nov. 24, 2014 (Retrieved Jan. 27, 2017).

File History of U.S. Appl. No. 15/193,935, 366 pages (Retrieved Aug. 28, 2018).

File History of U.S. Appl. No. 15/193,935, filed Jun. 27, 2016 (Retrieved Jan. 30, 2017).

File History of U.S. Appl. No. 15/674,084, 216 pages (retrieved Jan. 16, 2019).

File History of U.S. Pat. No. 9,411,964, 222 pages (Retrieved Aug. 28, 2018).

File History of U.S. Pat. No. 9,754,112, 226 pages (retrieved Jan. 16, 2018).

Gartner, Gartner Says Internet of Things Installed Base Will Grow to 26 Billion Units by 2020, 4 pages (Dec. 12, 2013). URL: http://www.design-reuse.com/news/33491/gartner-internet-of-things.himl [Retrieved Feb. 19, 2016].

Gilmont, T. et al., Hardware security for software privacy support, Electronics Letters, 35(24):2096-2097 (1999).

Jenei, S., Anti-Stacking Provisions Can Help Minimize Total Royalty Burden, 3 pages (Mar. 10, 2008). URL: http://www.patentbaristas.com/archives/2006/03/10/anti-stacking-provisions-can-help-minimize-total-royalty-burden, [Retrieved Feb. 19, 2016].

Jha, S., Software Security Issues in Embedded Systems, 2 pages. http://www.cs.wisc.edu/~jha [Retrieved Feb. 19, 2016].

Kean, T., Secure Configuration of Field Programmable Gate Arrays, Proceedings of the 11th International Conference on Field-Programmable Logic and Applications, 19 pages (2001).

Kerner, S.M., Network Equipment Market Growing to $51 Billion by 2015, 2 pages (May 11, 2011). URL: http://www.internetnews.com/infra/article.php/3933236/Network+Equipment+Market+Growing+to+51+Billion+by+2015.htm, [Retrieved Feb. 19, 2016].

Keromytis, A.D., Characterizing Self-Healing Software Systems, Department of Computer Science, Columbia University, 12 pages (2007).

Kolodgy, C.J., Market Analysis: Worldwide Security and Vulnerability Management 2011-2015 Forecast and 2010 Vendor Shares, 1: 31 pages (Aug. 2013). URL: http://www.qualys.com/dors/idc_VM_forecast2012.pdf [Retrieved Feb. 19, 2016].

Kommerling, O. and Kuhn, M.G., Design Principles for Tamper-Resistant Smartcard Processors. USENIX Workshop on Smartcard Technology, 13 pages (1999).

Lie, D., Architectural support for copy and temper resistant software, Proceedings of the 6th International Conference Architectural Support for Programming Languages and Operating Systems, 10 pages (2000).

Messerges, T.S. et. al., Examining Smart Card Security under the threat of Power Analysis, IEEE Transactions on Computers, 51(5):541-552 (2002).

MTC Group LTD., Morpher-Crypt the Script, 3 pages (May 14, 2010). URL: http://morpher.com [Retrieved Jun. 21, 2016].

Non Final Rejection for U.S. Appl. No. 14/551,341, 7 pages (Nov. 2, 2016).

Open Wrt Attitude Adjustment Router Firmware, 3 pages (2016). URL: https://dev.openwrt.org/log/branches/attitude_adjustment [Retrieved Feb. 19, 2016].

Pranith, D.K. et al., Hybrid Analysis of Executables to Detect Security Vulnerabilities, Proceedings of the 2nd India Software Engineering Conference, 141-142 (2009).

Reeves, J., Autoscopy Jr.: Intrusion Detection for Embedded Control Systems, Dartmouth Computer Science Technical Report TR2011-704, 97 pages (Aug. 2011).

Research and Markets: Industrial Control Systems (ICS) Security Market—Global Advancements, Market Forecast & Analysis (2013-2018), 5 pages (Nov. 19, 2013).

Schwarz, B. et al., Disassembly of executable code revisited, IEEE Working Conference on Reverse Engineering, 10 pages (2002).

Skorobogatov, S., Breaking Copy Protection in Microcontrollers, 13 pages (2001). URL: http//:www.cl.cam.ac.uk/~sps32/mcu_lock.html [Retrieved May 12, 2016].

Skorobogatov, S., Tamper Resistance and Physical Attacks, ECRYPT 2006 Summer School on Cryptology, 68 pages (2006).

Slobojan, R., Critical Security Vulnerability Found in QuickSort, 4 pages (Apr. 1, 2009). URL: http://www.infoq.com/news/20D9/04/quicksort-security-vulnerability [Retrieved Feb. 19, 2016].

Srivastava, A. and Eustace, A., Atom: A system for building customized program analysis tools, Proceedings of the ACM SIGPLAN 94 Conference on Programming Language Design and Implementation. 196-205 (1994).

Vinciguerra, L. et al., An experimentation framework for evaluating disassembly and decompilation tools for C++ and Java, IEEE Working Conference on Reverse Engineering, 14-23 (2003).

Weinghart, S.H., Physical Security Devices for Computer Subsystems: A Survey of Attacks and Defenses. Workshop on Cryptographic Hardware and Embedded Systems—CHES2000, 302-317 (2000).

* cited by examiner

| TYPE | Header Content |
|---|---|
| Addresses to information | Lookup table VPC, Path symbol table (static) |
| | Current VPC instruction (static, runtime) |
| | VPS location or call to VPC procedure (static, runtime) |
| | Loop start for where VPC is (static) |
| | Instruction following the VPC (static) |
| Data | Boundary for VPC during/before an exception (runtime) |
| | Last memory offset used by the VPC (runtime) |

FIG. 9

| A VPC Template | Pseudo-code (Steps) |
|---|---|
| Initialization of arguments | 1. Replace VPC with branch to template argument setup code<br>2. Use template header/runtime extracted to initialize template arguments<br>3. Call generic template constraining code |
| Constraining Part | 1. Check boundary on current VPC-P path<br>  (a) Adjust boundary to avoid attack<br>  (b) Predicate access to memory at an adjusted boundary<br>  (c) Execute VPC if within adjusted boundary<br>2. Branch to instruction post VPC |

FIG. 10

DETECTION AND HEALING OF VULNERABILITIES IN COMPUTER CODE

CROSS REFERENCE TO RELATED APPLICATIONS

This application is a continuation of U.S. application Ser. No. 16/272,405, which was filed on Feb. 11, 2019; U.S. application Ser. No. 16/272,405 being a continuation of U.S. application Ser. No. 15/674,084, which was filed on Aug. 10, 2017 and which issued as U.S. Pat. No. 10,248,792 on Apr. 2, 2019; U.S. application Ser. No. 15/674,084 being a continuation of U.S. application Ser. No. 14/551,341, which was filed on Nov. 24, 2014 and which issued as U.S. Pat. No. 9,754,112 on Sep. 5, 2017. The disclosures of U.S. application Ser. No. 14/551,341 and of U.S. application Ser. No. 15/674,084 and of U.S. application Ser. No. 16/272,405 are considered part of and incorporated by reference into the disclosure of this application as if set forth herein in full.

TECHNICAL FIELD

This disclosure relates generally to characterizing, detecting, and healing vulnerabilities in computer code.

BACKGROUND

With the proliferation of networked embedded systems, previously inconsequential embedded system nodes are becoming the target of attacks, including attacks by nation states. These embedded systems increasingly perform sensitive roles ranging from controlling our nation's critical infrastructure, to controlling the avionics in airplanes, to routing and controlling communications, and to even controlling medical devices, such as a pacemaker. Accordingly, the compromise of a single node (e.g., device) could have drastic consequences.

SUMMARY

An example process includes: identifying, by one or more processing devices, candidate code in executable code based on a static analysis of the executable code, where the candidate code includes code that is vulnerable to attack or the candidate code being on a path to code that is vulnerable to attack, and where information related to the attack is based, at least in part, on the candidate code; customizing, by one or more processing devices, a healing template based on the information to produce a customized healing template; and inserting, by one or more processing devices, the customized healing template into a version of the executable code at a location that is based on a location of the candidate code in the executable code. The customized healing template may include code that is executable to inhibit the attack. The example process may include one or more of the following features, either alone or in combination.

The executable code may comprise binary code generated from application code by a compiler executed by one or more processing devices; identifying may be performed at compile-time; and inserting may be performed at run-time. The candidate code may comprise a vulnerability point candidate (VPC). The VPC may comprise code in the executable code that is targeted for attack. The candidate code may comprise a vulnerability point source (VPS). The VPS may comprise, and be part of, a source of the path to code targeted for attack.

Identifying the candidate code may comprise identifying points within the executable code that are vulnerable to attack. Identifying the points may comprise: identifying memory store instructions that are in a program loop in the executable code and that operate on induction variables; and classifying at least some of the memory store instructions as points within the executable code that are vulnerable to attack. The process may include filtering the memory store instructions to produce the at least some memory store instructions. The at least some memory store instructions may be less than all memory store instructions. Filtering may include excluding at least some memory store instructions.

The static analysis may comprise: performing a static call-graph analysis to identify unique procedure caller-callee sets in the executable code; and modifying how a stack is organized inside a procedure of the executable code. The customized healing template may comprise code that is executable to inhibit the attack upon occurrence of the attack at run-time, but that is not executable in a case that the attack does not occur.

Identifying the candidate code may comprise determining an offset from a memory address associated with the candidate code to create a boundary, where an identity of the boundary being part of the information. Determining an offset from a memory address may comprise: storing a first value and corresponding to an address that is prior to a loop containing the candidate code; and storing a second value corresponding to an address that is immediately prior to the candidate code that is vulnerable to attack.

Identifying the candidate code may comprise identifying multiple instances of candidate code. The example process may comprise: determining which of the instances of candidate code was actually subjected to attack at run-time; and modifying the customized template at run-time so that the customized template is specific to an instance of candidate code was actually subjected to attack.

The customized template may be inserted into executable code to replace the candidate code. The customized template may be inserted into executable code at a point immediately prior to the candidate code.

An example process includes: identifying instances of candidate code in executable code based on a static analysis of the executable code, where the instances of candidate code comprise code that is vulnerable to attack or the instances of candidate code are on a path to code that is vulnerable to attack; inserting a healing template into a version of the executable code at a location that is based on a location of an instance of the candidate code in the executable code, where the healing template comprises code that is executable to inhibit the attack; identifying which of the instances of candidate code was actually subject to the attack at run-time; and updating the healing template to produce an updated healing template. The updated healing template comprises information that represents a path and a state that caused the attack. The example process may include one or more of the following features, either alone or in combination.

The executable code may comprise binary code generated from application code by a compiler executed by one or more processing devices; identifying the instances of candidate code may be performed at compile-time; and inserting may be performed at run-time. Each instance of candidate code may comprise a vulnerability point candidate (VPC), and the VPC may comprise code in the executable code that is targeted for attack. Each instance of candidate code may comprise a vulnerability point source (VPS). The VPS may comprise, and be part of, a source of the path to code targeted for attack.

Identifying the instances of candidate code may comprise identifying points within the executable code that are vulnerable to attack. Identifying the points may comprise: identifying memory store instructions that are in a program loop in the executable code and that operate on induction variables; and classifying at least some of the memory store instructions as points within the executable code that are vulnerable to attack.

The example process may comprise filtering the memory store instructions to produce the at least some memory store instructions. The at least some memory store instructions are less than all memory store instructions. Filtering may comprise excluding at least some memory store instructions that do not carry a payload.

The static analysis may comprise performing a static call-graph analysis to identify unique procedure caller-callee sets in the executable code; and modifying how a stack is organized inside a procedure of the executable code. The healing template may comprise code that is executable to inhibit the attack upon occurrence of the attack at run-time, but that is not executable in a case that the attack does not occur.

Identifying the instances of candidate code may comprise determining an offset from a memory address associated with the candidate code to create a boundary, where an identity of the boundary is part of the information. Determining may comprise: storing a first value corresponding to an address that is prior to a loop containing the candidate code; and storing a second value corresponding to an address that is immediately prior to the candidate code that is vulnerable to attack.

The example process may comprise performing, by one or more processing devices, an address space layout randomization (ASLR) process to inhibit attack against the executable code.

Identifying may comprise dynamically altering, by one or more processing devices, address ranges and start addresses allocated to local storage frames used for register spills and local variables. Identifying may comprise dynamically jittering by one or more processing devices, a caller-callee convention based on a random seed defined at startup.

The example process may comprise performing a trace to identify a vulnerability point candidate (VPC) that was subject to attack and a path on which the VPC is located.

An example process may comprise performing, by one or more processing devices, a static analysis of computer code to identify a memory instruction in the computer code that constitutes vulnerability in the computer code. The example process may include one or more of the following features, either alone or in combination.

The memory instruction may have a linear access at runtime. The memory instruction may be repeatable and operate on an induction variable. The vulnerability may result from user-system or system-system interactions causing violation of predefined boundaries in the memory instruction. The example method may comprise preventing execution of the memory instruction based on the static analysis.

The systems and systems described herein, or portions thereof, can be implemented as a computer program product that includes instructions that are stored on one or more non-transitory machine-readable storage media, and that are executable on one or more processing devices to implement (e.g., to perform) the operations described herein. The systems and systems described herein, or portions thereof, can be implemented as an apparatus, method, or electronic system that can include one or more processing devices and memory to store executable instructions to implement various operations.

The details of one or more implementations are set forth in the accompanying drawings and the description below. Other features and advantages will be apparent from the description and drawings, and from the claims.

DESCRIPTION OF THE DRAWINGS

FIG. 9 shows example of components of header information for an example VPC healing template used by the example processes described herein.

FIG. 10 is an example of pseudo-code for an example healing template.

DETAILED DESCRIPTION

Figure 1:
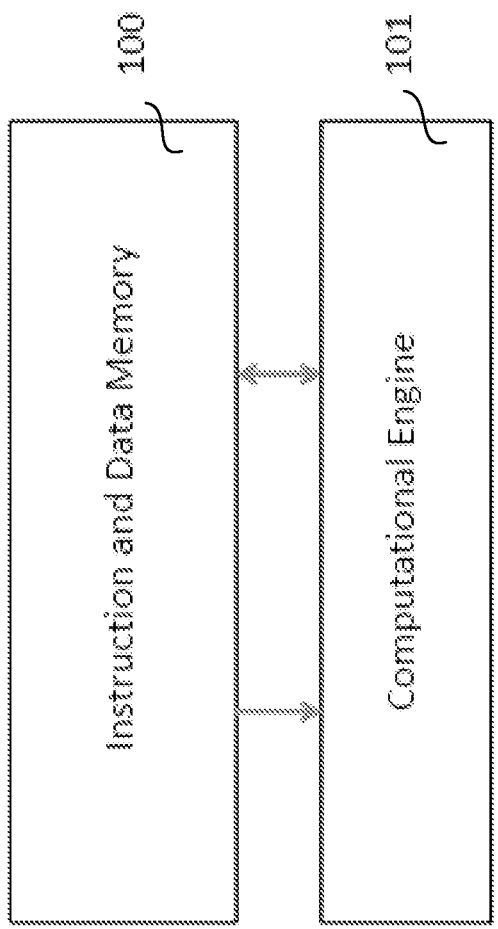
FIG. 1 is a block diagram of example computer architecture on which the example processes described herein may be implemented.

An "attack" or "exploitation" is an act that leverages a vulnerability in computer code to gain control of the computer code, to access or to leak information accessible to the computer code, or to otherwise compromise a system's functionality or security. In an example, a vulnerability is a memory instruction within computer code that, along some path of the program's execution, allows for memory accesses that violate intended boundaries in memory, which can potentially lead to compromise at runtime. In an example, an attack or exploitation includes processes by which an attacker causes user-system or system-system interactions, which cause violation of the intended boundaries in a memory instruction. For example, the attack may include an instruction that reads outside of an intended memory boundary. In some implementations, an exploit or attack interacts with the system in a way that may cause gaining control, access to information, and/or enabling further attacks.

This disclosure describes example processes that enable autogenous detection of attempts at attacks or exploitations of computer code, and that enable on-demand healing of the targeted code. The example processes leverage the following to enable vulnerability detection before the computer code is compromised, while also enabling vulnerability identification and healing at runtime: a static vulnerability point characterization concept, memory-layout encoding and utilization architecture for detection, and associated runtime support. As opposed to other solutions, which rely on an attacker successfully injecting functionality prior to detection, the example processes detect the attempted attack prior to transfer of control to the attacker. Additionally, the example processes include healing processes that, in some cases, are capable of protecting previously-vulnerable code from future attacks. In some cases, a healing process relies on a program analysis technology to characterize program vulnerabilities and to generate generic healing code templates that can be autogenously adjusted at runtime in response to specific attacks. The templates can be customized (e.g., changed, modified, etc.) to address particular vulnerabilities, either at compile-time or at runtime.

The overall approach of leveraging static program information as a guiding mechanism in conjunction with a runtime system can mitigate code-size and performance overhead. Additionally, the example processes are CPU (central processing unit) and operating system agnostic and, thus, are widely applicable. The static analysis technology can be incorporated at the source or binary level. In this context, static program analysis includes the analysis of computer code that is performed without actually executing the computer code.

In the example implementations described herein, an embedded system includes a computer system (e.g., one or more processing devices and memory) that is resident within a larger mechanical or electrical system. The embedded system may communicate with external systems, devices, and/or networks, and may control or direct operation of the mechanical or electrical system. The example processes are described in the context of an embedded system; however, they may be used with any appropriate type of computer system and are not limited to use with embedded systems The example processes are based on the fact that, fundamentally, attempts at exploitation on embedded systems require either system-to-system or user-to-system repeatable interactions and changes to memory. During normal operations, these interactions drive underlying functionality for which the embedded system was designed. But, when created or formatted in a specific way, these interactions can provide a way for malicious code to gain access to, or exploit, a system. An aspect of the example processes, and a reason why they apply to various types of computer code (e.g., software) vulnerabilities, is that the foregoing interactions can be characterized statically. By performing static analysis on an embedded system's firmware, the example processes are able to identify, at compile-time, all or substantially all points in code that meet criteria required to enable exploitation via unexpected or uncontrolled interactions. At a high-level, this can translate into identifying a subset of memory store instructions (enabling access to system memory) that reside in a loop (providing repeatability) and operate on an induction variable (enabling contiguous writing in memory to inject a meaningful malicious payload).

Using static analysis, in some implementations, the majority of such memory instructions can be further filtered, and thereby removed if they can be shown not to be related to system-to-system or user-to-system repeatable interactions. The remaining identified instructions are referred to as Vulnerability Point Candidates (VPCs). In this regard, in some examples, a VPC is a memory instruction that meets certain requirements, such as those described herein.

In an example, to be considered a VPC, a memory instruction has the potential to be influenced by user-system or system-system interactions, is repeatable/predictable, and has a predictable memory access pattern such that it can be exploited. In view of these requirements, in some implementations, a VPC is determined as follows. A VPC is an instruction that cannot be proven statically to not be potentially influenced by user-system or system-system interactions. Double negation is used in this definition since it allows the VPC to capture all vulnerabilities by starting with all instructions and removing only those that can be proven not to be actual vulnerabilities (as defined above).

Combined with the other characteristics described above, in compiler terminology, VPCs can be mapped to memory instructions that cannot be shown to not be influenced by user-system/system-system interactions (e.g., possible vulnerabilities) with intra- and inter-procedural analysis (described below), and that are loop-induction-variable affected in an affine pattern (e.g., a repeatable and predictable memory access pattern for a meaningful attacker payload). Generally, affine memory access is a memory access that has a known linear access pattern at runtime. This is typically achieved when a memory access address is based on a loop index variable having constant coefficients and additive constants. The difference between subsequent addresses for an affine memory access at runtime is called a stride. Affine memory accesses typically have well defined and constant strides The word "candidate" is used in "VPC", since at compile-time, VPCs are only candidates for vulnerability, since no attack has yet occurred. Thus, no overhead is typically incurred as a result of unnecessary patching (those which are provable vulnerabilities at compile-time can be healed prior to deployment, although this may be a minority of vulnerabilities). In some implementations, it is not until the VPCs are actually targeted for exploitation will a VPC be considered to be an actual vulnerability and will be autogenously healed according to the example processes described herein (e.g., healing templates described below). Also, in some implementations, these vulnerability points contain all real vulnerabilities. In some cases, false positives (e.g., vulnerabilities that are not actual vulnerabilities) are not an issue, since there may be no overhead added for healing codes at compile time and VPC locations can be encoded relatively compactly in an information table incorporated for processor runtime use.

Since the VPCs are typically only healed in response to an attempted exploitation or attack, e.g., on-demand, performance overhead may not be an issue and the example processes are able to meet the typically tight requirements of embedded systems. In some implementations, any VPC that is statically proven as vulnerability can be fixed statically.

In addition to VPCs, the associated path to a VPC (VPC-P), referred to also as a vulnerability point source (VPS) or point of origination (VPO), may also be identified at compile-time and utilized at runtime healing according to the processes described herein. In this regard, a path in the computer code (e.g., a branch) to a VPC includes what is referred to herein as a "vulnerability point of origination" (VPO). In some implementations, a VPO (also referred to as VPS or VPC-P) is defined to be the point (e.g., the instructions, routine, definitions, or the like) in computer code at which any kind of memory is allocated and its intended boundaries/range are established. This includes both static (fixed at compile time) and dynamic (runtime-dependent) memory allocations. VPOs may be identified through a combination of static analysis and runtime (inserted off the critical path statically but operating at runtime as a measurement of dynamic VPOs) approach. VPOs are characterized through the boundaries of memory they define. Each VPO has two components—statically identifiable code in the program that performs memory allocation when executed and a range of memory that is allocated by that code when it executes at runtime. The example processes described herein relating to identifying VPCs and healing VPCs is also applicable, where appropriate, to VPOs (VPSs, VPC-Ps).

At runtime, the example processes are privy to the exact data that is used to exercise a VPC. In this example, that data is the data that is used in the context of a specific attempt at exploitation or attack. Thus, the example processes' healing methodology is a hybrid one: it spans compile-time characterization and preparation, and runtime insertion to provide VPC-agnostic healing. The characterization relates to identifying vulnerability points and paths. In some implementations, the compiler generates generic VPC-agnostic healing templates, which may then be updated at runtime to reflect the path (VPC-P, VPO, VPS) and data actually used in an exploitation attempt or attack. Given that healing may only be triggered when a VPC is subject to exploitation or attack, the resulting solution can yield reduced code-size and performance overhead while, in this example, reliably healing the vulnerability.

An example detection approach is described in more detail below. In this regard, in order to detect an exploitation attempt, the example processes rely on fundamental characteristics associated with exploitations or attacks on computer code. For instances, the example processes use the fact that attackers rely on assumptions as to how an application will execute and how it will utilize memory, or the layout of its local variables and inter-procedural interfaces, to exploit vulnerabilities. These assumptions stem from how an application is compiled. During code generation, compilers typically operate on a fixed set of assumptions with regard to both inter- and intra-procedural data flow, keeping these conventions appropriately uniform and deterministic. Attackers often rely on these assumptions being maintained in order to successfully mount attacks on computer systems. For example, a classic buffer overflow exploitation often relies on a specific stack-frame organization such that the data operated upon by the vulnerable code (e.g., the data stored by the VPC) can meaningfully modify a return address in a prior stack-frame, consequently transferring control to the attacker's injected malicious payload. Many other examples exist utilizing not only memory utilization assumptions but also argument-passing assumptions e.g., return-to-libC exploits, as well as others. libC here refers to the standard cell library commonly used in compilers. This library implements functions that are common in computer code.

The example detection processes described herein rely on these assumptions, and attempt to break them both statically, through compiler techniques, and dynamically, through runtime adjustments. The example processes may leverage Address Space Layout Randomization (ASLR), which is a coarse-grained technique, and combine ASLR with more fine-grained compiler-enabled techniques. In this regard, ASLR is a process-level technique that affects the address of the base of executable code and positions of stack, heap, and libraries. ASLR is often successfully employed, but occasionally can be overcome by an attacker that is aware of the technique being present, by simply guessing correctly. This disclosure integrates ASLR with more fine-grained techniques, thereby providing a more robust methodology than ASLR alone.

Depending on the type of data-flow, attackers' assumptions have varying degrees of sensitivity in terms of affecting an application's overall execution, and consequently the granularity at which these assumptions can be redefined and randomized. For example, how information is passed to and from procedures requires consistency (such as order and register use, and layout of memory) in order to maintain correctness. But there may be unique assumptions made per caller-callee sets. The example processes may use a static call-graph analysis to identify unique procedure caller-callee sets, each of which can operate on a unique set of assumptions without impacting correctness. In addition, the procedure internal stack organization can also be affected, since modifying how the stack is organized inside one procedure in a portion of computer code for an application can be made so as to not have an effect on the application as a whole, or other procedures. This enables a detection process that creates a unique intra-procedural memory layout and memory utilization architectures on a per-procedure basis. In some implementations, the detection process spans both compile-time and runtime layers to create unique and dynamic data-flow (on interfaces) and memory layout assumptions (intra procedural) that break an attacker's ability to reliably exploit an application based on a deterministic convention. In some cases, the low-overhead nature of the example processes stems from only affecting layout and order, leaving to a large extent the code generated, e.g., the instruction sequences, unchanged.

An example implementation of the processes is described below. This example starts with analyses used for characterization, followed by a detection process and a healing process performed at runtime The example processes span compilation and runtime, as described above. The example processes provide ways of implementing autogenous detection of attempts at exploitation or attack as well as an on-demand healing of the targeted code. In some examples, the processes include a static vulnerability point (e.g., VPC) characterization, memory layout and utilization architecture, and associated runtime support. These features enable exploitation or attack attempts to be detected prior to compromise of the computer code, while also enabling runtime vulnerability path identification and healing. The example processes include a healing methodology that is capable of making a previously vulnerable portion of code invulnerable (at least to the same type of attack). The example processes use healing templates capturing support for classes of vulnerabilities and layered, on-demand insertion of runtime adjusted healing codes based on templates, upon detection of an exploitation attempt.

FIG. 1 shows example hardware on which the example processes described herein may be implemented. Referring to FIG. 1, the main functions of a device or apparatus executing computer program code are shown. These maybe implemented on an architecture commonly referred to as the von Neumann computer. The von Neumann computer is a functional model of the abstract symbolic automata, commonly referred to as the Turing machine. In this example, computer code (e.g., software) is stored in some memory or backup store 100, and it encodes operations for the compute engine 101. The resulting output can be stored internally or written back to memory or a backup store 100. The example processes described herein are not limited to use on the architecture of FIG. 1, or to use with embedded systems, and may be used with any appropriate computer architecture.

Figure 2:
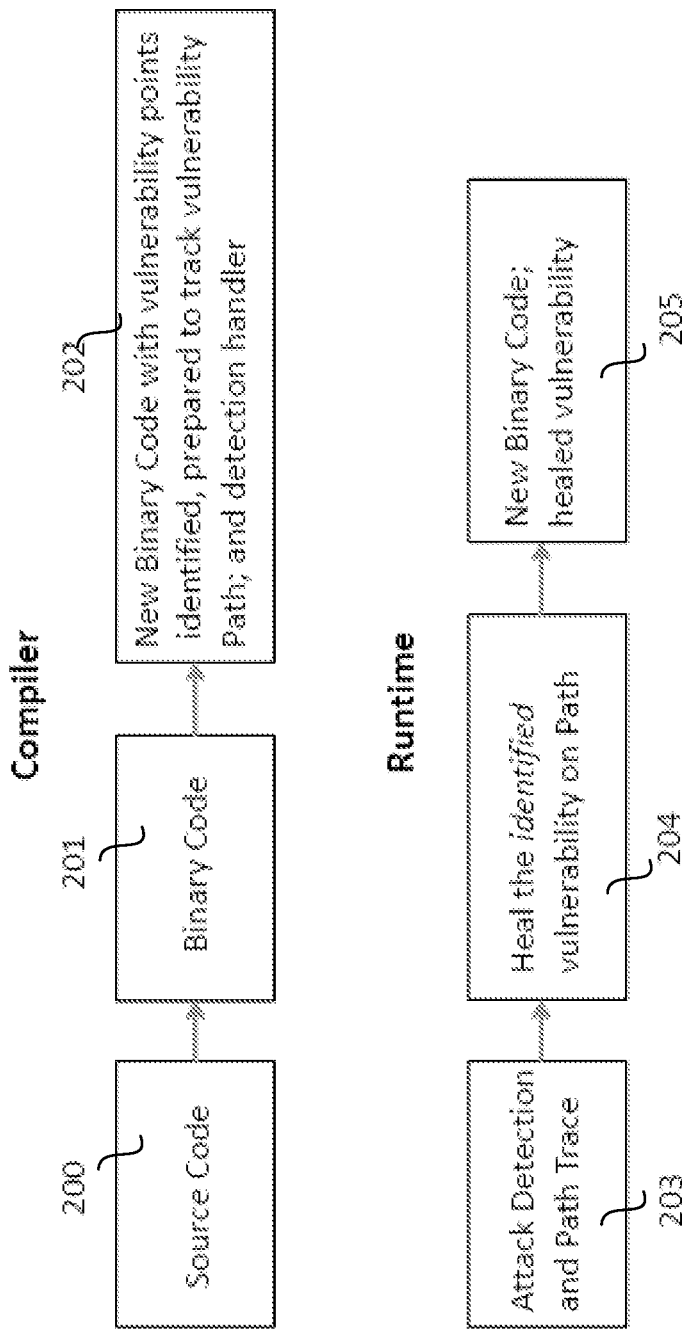
FIG. 2 includes a block diagram showing example operations associated with compile-time operations performed by the example processes, and a block diagram showing example runtime operations performed by the example processes.

Referring to FIG. 2, the operational flow of an example implementation begins with source-level compilation of firmware 200 to produce executable code (or simply, an "executable", 201). The resulting executable is passed into a binary-level compiler that performs vulnerability characterization analyses, exploits detection related analyses, and transformations, and also prepares the executable to enable runtime vulnerability path identification and healing in response to attempts at exploitation or attack 202. This binary-level compilation is described in more detail below, along with specific analyses. In addition, at compile time an Intrusion Detection Handler (IDH), which may be similar to an exception handler, is added to the code to drive runtime characterization and healing of vulnerable code. Upon completion, the binary-level compiler outputs an executable that is ready for deployment 202. Prior to an attack, at runtime, this executable running 203 in its prepared form.

In this example implementation, upon detection of an attempt at exploitation or attack 204, as described below, the IDH attempts to identify the specific VPC that was the target of the attack. In some cases (not shown) more tracking for the particular suspicious vulnerability point can be inserted. Note that approaching this problem in a layered fashion is acceptable because the exploit detection methodology does not typically allow compromise of the system. The additional tracking can be removed after healing (during operation 205).

Based on the information obtained through static analysis (203), in this example, the IDH is able to identify which VPC was targeted, the path used to reach the VPC, what data was used to exercise the vulnerability, and which healing-code template applies given this information. Based on this information, the IDH updates a VPC-agnostic template to reflect the path and state that caused exploitation, thereby producing a template that is customized for that VPC 204, and inserts the resulting customized template code into the application binary to ensure that this vulnerability cannot be exploited in the future 205. Since only the specific path and specific VPC are healed in this example implementation, performance and code-size impact incurred through this patching architecture may be reduced. Given the networked nature of the example solutions, the healing template that was updated for the current exploitation/exploit/attack can also be transmitted to other nodes on the network to preemptively heal those nodes as well.

Binary-Level Compiler Technology Overview

Through the use of compiler analyses and processes, the example processes described herein are able to statically identify potential vulnerability points in a program's executable, to modify the layout of data-flow within the executable resulting in inherent exploitation detection, and to extract patching information to enable the runtime healing.

Figure 3:
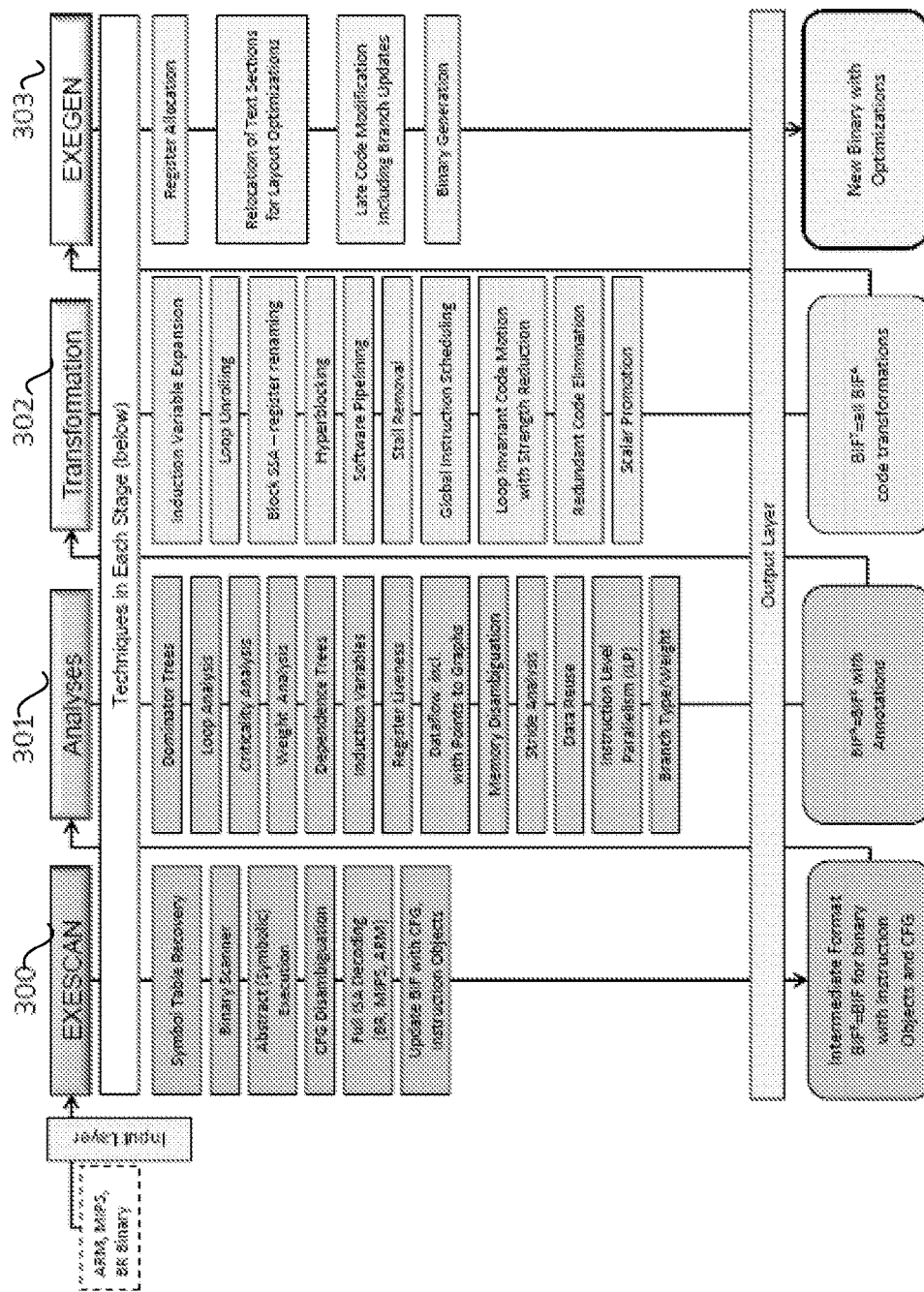
FIG. 3 is a block diagram of an example binary-level compiler.

An example binary-level compiler is described below. This is an example and is not intended to be limiting. Other compilers, whether at the source or binary level, could be used. In the example of FIG. 3, the compiler includes four phases: ExeScan (300), Program Analyses (301), Program Transformations (302), and ExeGen (304). The ExeScan (Executable Scan) phase operates on a compiled executable (for example ELF, PE), with the role of disambiguating text and data sections to create a binary intermediate format (BIF) upon which the following stages can operate. ELF stands for Executable and Linkable Format. PE stands for Portable Executable. These are commonly used binary formats. Others can also be supported. This phase traverses the executable's code, filling the intermediate format with structures of varying levels of abstraction, ranging from the procedure-level, to the basic block level, down to instructions containing operands and registers. In this example, the processes performing this "control-flow building" operation are written in an ISA (Instruction Set Architecture) agnostic fashion, with a specific module (a decoder) that is ISA dependent. This translates into a tool that can be updated to support new ISAs.

Upon completion of ExeScan, the core phases of the compiler contain the program analyses and transformations. Example analyses and transformations already implemented are shown in FIG. 3. These are mainly ISA independent and are performed on a symbolic intermediate format. Some of the analyses include, but are not limited to, local and global criticality analysis, loop and weight analysis, induction variable analysis, register liveness, inter- and intra-iteration dependencies, various data-flow analyses for memory disambiguation, stride, and reuse. When run, the intermediate format is annotated with information collected for use by later phases. Transformations in the compiler include various performance related transformations ranging from renaming, to stall removal, to sophisticated loop transformations including loop unrolling and software pipelining for exposing instruction level parallelism, and global instruction scheduling. In this example implementation, all of these transformations are completed on the BIF intermediate format.

The final pass of the example compiler is called ExeGen (Executable Generation). In this phase, a new binary executable ("binary") is generated based on the transformed intermediate format and the information collected throughout previous analyses. In order to perform binary generation in this example, artifacts of previous analyses and transformations, such as relocated code, virtualized registers, branch target updates, insertion of any static data, etc. are resolved. The final operation in this phase is the assembly of a new binary. This includes updating the original binaries headers, section table entries, text and data sections, and symbol table information.

Figure 4:
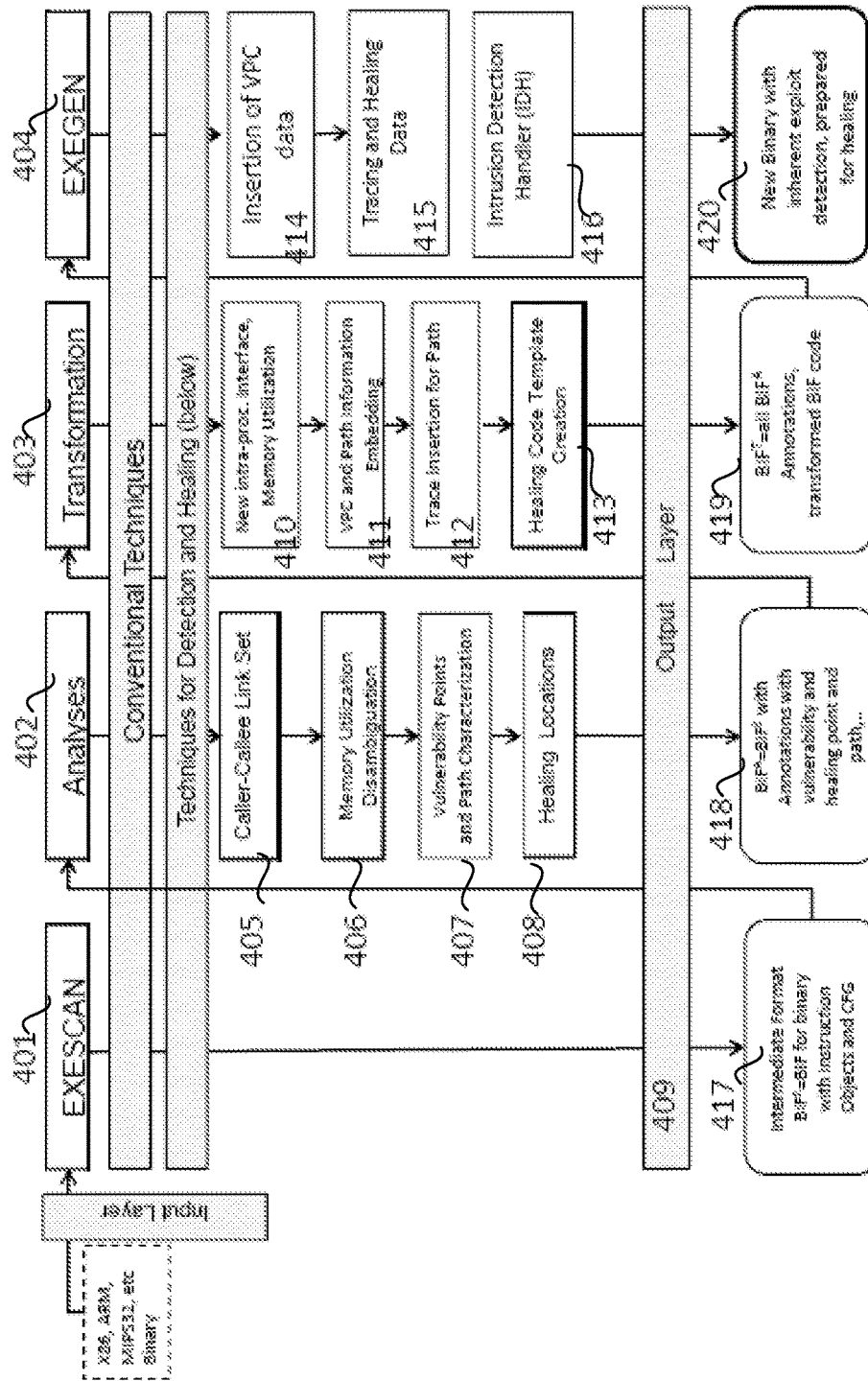
FIG. 4 is a block diagram of an example binary-level compiler that includes extensions for implementing the example processes described herein.

The compiler can be extended to aid in the functionality performed by the example processes described herein, e.g., exploitation detection, vulnerability path identification and characterization, and healing. FIG. 4 highlights extensions in each phase (also referred to a "stage") of the compiler infrastructure of FIG. 3 that are incorporated to aid in exploit detection, vulnerability path identification and characterization, and healing.

In this example, the main additions to the compiler are in the program analyses and transformation phases 402 and 403. In addition to the extension of existing analyses, more focused analyses are added to aid in exploitation detection, such as caller-callee link-set analysis 405 and intra-procedural data-flow for memory disambiguation inside a procedure 406, vulnerability point characterization and vulnerability path analysis 407, and healing insertion location analysis 408. These analyses result in annotations being added to the intermediate format 418, updating the original 417, through the output layer 409 so that during the transformation stage 403, the necessary transformations and aggregation of data can occur.

A purpose of the transformation stage is to modify the code in such a way as to enable inherent exploitation detection 410, embed vulnerability point candidates related representation of data for use in runtime VPC-characterization 411, enable both course- and fine-grained VPC-P tracing 412, and define customized VPC-agnostic healing templates 413 that will be adopted at runtime and that can be updated/customized at runtime. In this example, the final phase 404 of the compiler performs clean-up processes to promote proper execution and also to inject IDH handler code 416. Additionally, this phase (stage) inserts, into the binary executable, the generated static information in the form of static data/information table(s) 414 and 415.

Runtime Technology Overview

Figure 5:
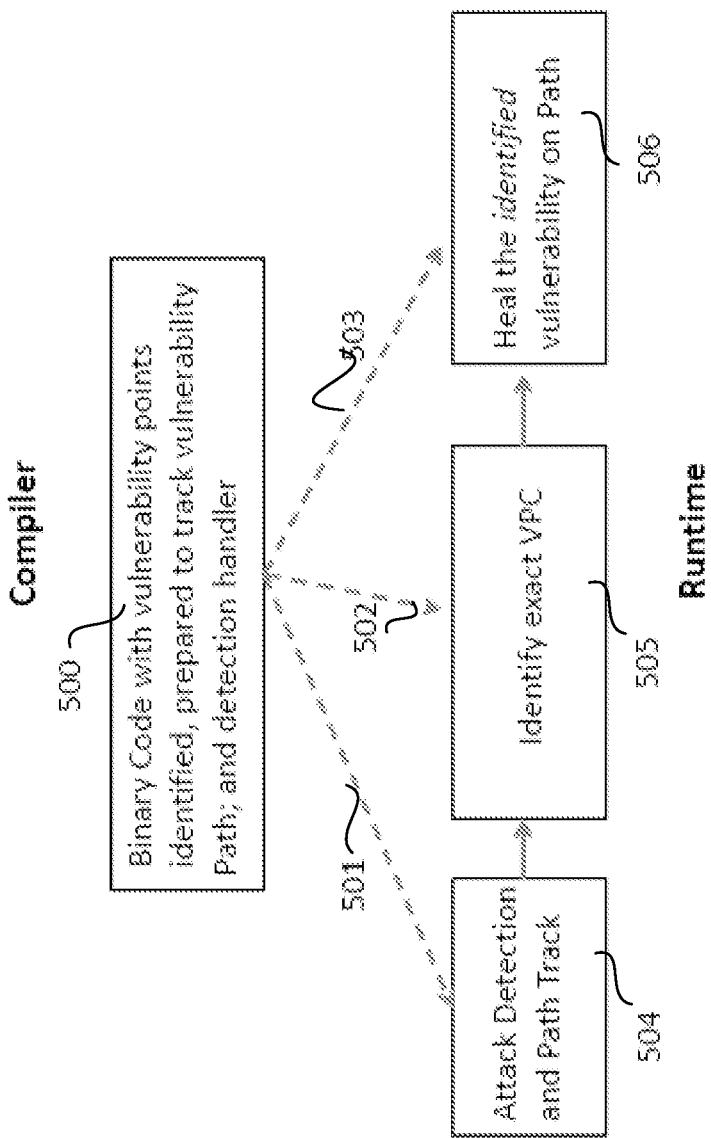
FIG. 5 is a block diagram showing relationships among compile-time information and runtime operations performed by the example processes.

In some implementations, the above-described compile-time techniques guide and drive the runtime components of the example processes. Referring to FIG. 5, the compile-time techniques 500 include generating binary code and identifying vulnerability points in that code. The compile-time techniques also include preparing to track vulnerabilities in the code, and implementation of a detection handler, as described elsewhere herein. In some implementations, the runtime component are comprised of three related categories as shown in FIG. 5: (1) exploitation detection (attack detection and path tracking—504), (2) vulnerability identification and characterization (identify VPC—505), and (3) healing code insertion/adjustment in the binary (heal the identified vulnerability on the path—506). The relationship between compile-time information and runtime actions may be tightly-coupled, as shown in FIG. 5.

Statically, vulnerability characterization support is part of the example processes. This drives the VPC-focused exploitation detection transformation, while ultimately (in some implementations) resulting in a unique and randomized memory utilization layout and inter-procedural interfacing data-flow, directly enabling the detection of exploitation attempts at runtime. Upon detection, the IDH may also utilize the statically-generated VPC-related information to insert additional VPC-healing related tracing functionality. This will allow the IDH to update the VPC-agnostic healing template with the specific VPC and exploit-related information, and heal the vulnerability, as described herein.

Static Vulnerability Characterization

As explained above, the ability to statically identify possible vulnerability points (e.g., VPCs) in a computer code (e.g., a "program executable" or "binary executable") is part of the example processes described herein, since it seeds other compile-time analyses, which enable runtime support for detection and healing. Described here are example VPC identification processes, including example static analyses that may be performed, and that provide code examples.

When attempting to statically identify potential vulnerability points, it may be useful to view the problem in terms of the goals of an attacker. The main goal of many attacks is to successfully inject a malicious payload into a system, either to modify the system's intended functionality, or to exfiltrate data. The attacker requires an entry point accessible through over-the-wire, system-to-system, or user-to-system interaction as well as the ability to inject the malicious payload into memory.

In some examples, a feature of the vulnerability point detection and characterization processes is to identify a set of (e.g., all) points within the firmware that support the attacker's needs. In terms of program analysis, this translates into performing operations comprising identifying and classifying memory store instructions (enabling access to system memory) that reside in a loop (providing repeatability) and that operate on an induction variable (enabling contiguous writing in memory to inject a meaningful malicious payload). In addition, excluded are accesses that provably cannot carry a payload that is a result of aforementioned interactions.

The points within the executing program code that support the attacker's needs are the VPCs, described above. In some implementations, no performance overhead (i.e., execution slowdown) is incurred since this information is extracted for runtime guiding purposes only and will not affect performance until a VPC is targeted and subsequently healed.

In an example implementation, the VPC characterization analysis captures substantially all (or all) real vulnerabilities. False positives may also be present, since not all identified VPCs can be actually exploited. However, determining statically which paths are, and which are not, vulnerabilities may not be possible because boundary conditions often are data dependent and interactions are complex. Nevertheless, the example processes, while capturing all or substantially all cases that are exploitable, do not typically result in overhead for false positives since (in this example) there are no guards or code modifications completed statically. In this example implementation, encoding of the VPC information is implemented using minor storage overhead, and actual modification to the code happens only after runtime exploit detection.

Support for Induction Variable Identification Relevant to VPCs

One of the first operations that may be performed as part of the example processes is an induction-variable analysis. In this example, an induction variable includes a register that is only defined once in a loop, where the register definition is linear and invariant, the register definition occurs on all loop paths, and the register definition does not exist in an inner-loop. The VPC-related analysis identifies more cases than are typically considered induction variables, e.g., the register definition may not necessarily need to occur on all paths. On the other hand, certain types of linear transformations that are based on large strides may be ignored since they may be unfeasible for an attacker (attacks require contiguous access or predictable short strides).

Figure 6:
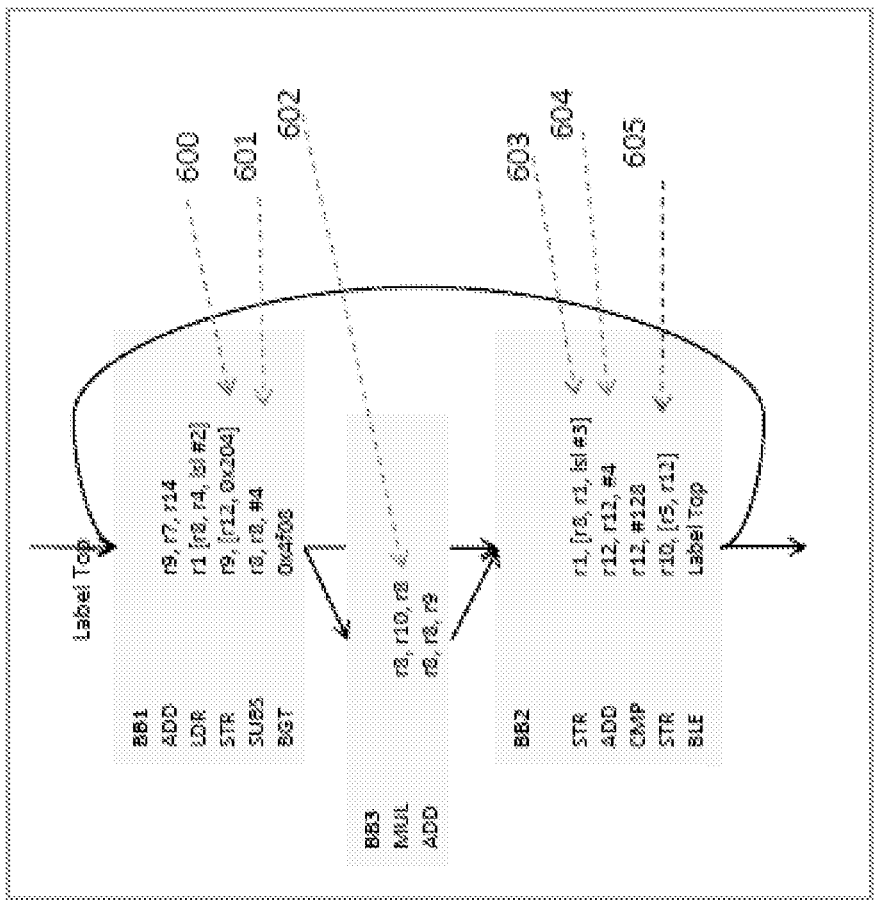
FIG. 6 shows an example of a loop and control flow illustrating identification of induction variables and vulnerability point candidates (VPCs).

FIG. 6 shows an example of a loop and control flow to illustrate the identification of induction variables and VPCs. In this first example, the loop structure includes three basic blocks. The arrows and associated instructions highlight some situations of interest with regards to induction variable identification. Line 604 highlights an instruction that increments r12 by constant value #4. Because r12 is only updated by this instruction and is resident in a basic block that is provably reached via every loop path, it meets the criteria of an induction variable that is also relevant for VPC identification In this example, r8 is not deemed to be an induction variable relevant to VPCs in this loop. In basic block BB1, r8 is decremented by a constant value of #4 in every loop iteration. However, r8 is also modified through a multiplication instruction on one of the paths that would remove it from VPC consideration since it has a non-linear access pattern. In some instruction sets registers used in address definition could automatically incremented to decremented effectively becoming induction variable candidates.

Vulnerability Point Candidate (VPC) Identification:

In some implementations, an example VPC identification process directly ties into the example exploitation detection, the example runtime path identification, and the example healing process, which are described herein.

In this regard, most loops contain many memory instructions. In fact, statistically, it can be expected that in a RISC binary, 25% of the instructions will be memory instructions, with a third of these being memory writes. The example processes attempt to identify a specific class of memory writes that can enable the goals of an attacker, such as VPCs.

The example in FIG. 6 has several memory instructions of interest. Instruction 605 could represent a VPC since it is based on an induction variable and has a linear access pattern, if the instruction also could not be excluded for being unrelated to system-system or user-system interactions. This example shows an instruction that stores the contents of r10 to the memory address defined by the expression r5+r12. As previously noted, in this example, r12 has been identified as an induction variable. Conversely, 603 highlights a store instruction that does not meet these criteria. This instruction relies on r8 and r1 to define its address. In this loop, as shown, r8 is not identified as an induction variable because it is modified in a non-linear fashion. The other address register, r1, is also defined via a load instruction, overall causing an access pattern that cannot be leveraged by an attacker for payload insertion.

Finally, instruction 600 highlights an example of an instruction that turns out not to be a VPC. It stores the same invariable content of r9 into the memory. r9 cannot be modified in the loop since it is based on the sum of two invariant registers r7 and r14. Because an attacker's goal typically is to write a meaningful payload into memory to enable further exploitation, code to write a constant is not classified as a VPC in this example implementation. However, in other implementations, this may not be the case; that is, in other implementations, code to write a constant may be classified as a VPC or may relate to classification of a point in code as a VPC.

Figure 7:
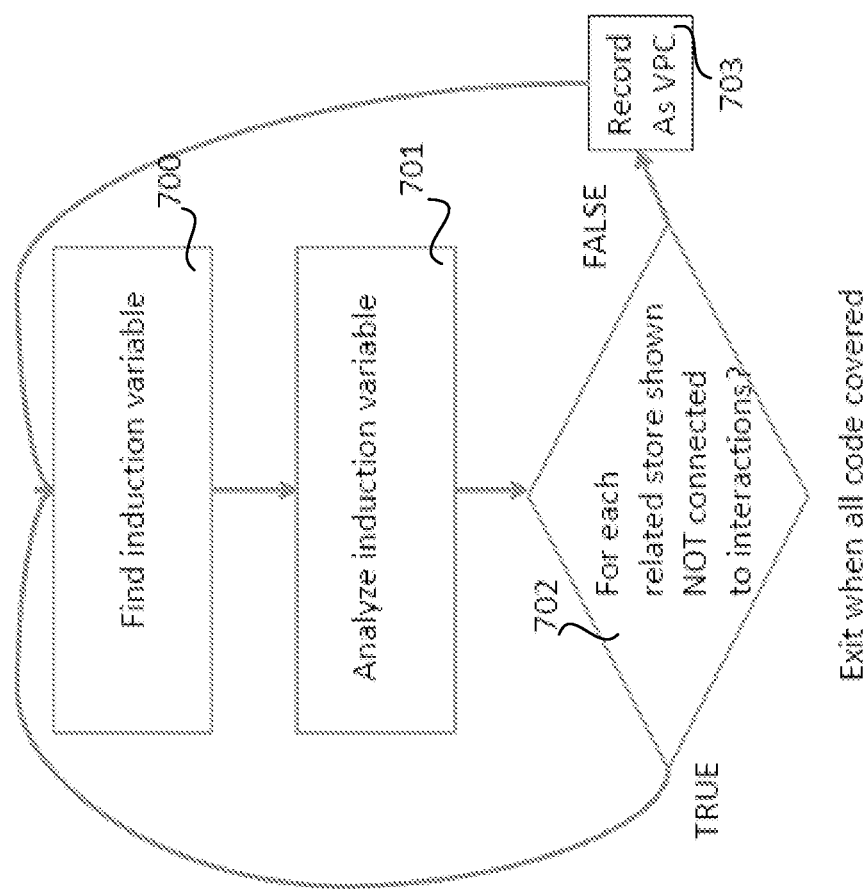
FIG. 7 is a flowchart showing an example process for identifying VPCs.

FIG. 7 shows an example VPC identification process. Other processes are possible and this process can be adjusted to be more inclusive or to further filter the vulnerabilities considered. This process begins by finding an induction variable in 700, then analyzing 701 the variable for properties that would filter out induction variables that cannot be linked to VPCs. The process includes determining whether to select 702 memory accesses (e.g., "stores") that relate to the selected induction variable and that cannot be shown to not be tied to system-system or user-system interactions, and recording (703) selected memory accesses (those not so tied—"false") as VPCs, e.g., in a table or elsewhere accessible in memory. Those that are tied ("true") are not recorded as VPCs. This process may iterate until full code coverage is achieved.

Encoding of VPC Information

In this example implementation, the final operation in the VPC identification process is to package information regarding the VPCs in an efficient way, so that it can be utilized by the IDH at runtime when attempting to heal from an attempt at exploitation or attack.

In order to calculate the size required for the address, the example processes determine the number of instructions, and encodes the number in corresponding number of bits in compressed format.

Exploitation Detection

Similar to the example VPC characterization processes, the example exploitation detection processes are based on fundamental characteristics of how exploitations of computer code vulnerabilities can be achieved. The example detection processes enable exploitation detection by focusing on the layout/interfaces of computer code, while not modifying the core functionality or the computer code's interface to the outside world. Because there is information regarding which procedures and code segments within the code contain potentially vulnerable code (through VPCs), the example processes focus the exploitation detection techniques more specifically. Once the assumptions regarding an application's interactions are broken at runtime during an exploitation attempt, an exception will occur because the computer code is no longer operating as indented. The example IDH hander will catch this exception, as described elsewhere herein.

The application layout and interfacing-related assumptions are based on how application code is compiled. During code generation, compilers operate based on a fixed set of conventions with regard to both inter-procedural data flow and intra-procedural data flow. Attackers rely on these conventions being maintained and being deterministic. For example, the classic buffer overflow exploit often relies on a specific function-to-memory interaction and a stack-frame organization, such that the data operated upon by the vulnerable code, e.g., the data stored by the VPC, can meaningfully modify a return address in a prior stack-frame, consequently transferring control to the attacker's injected malicious payload. Other examples relate to function-to-function interactions. This may include argument-passing and return values that can be utilized by attackers to execute malicious codes. In return-to-libC exploits, attackers can execute preexisting code in an unintended, malicious manner.

One technique that is used to combat exploitation is ASLR, which is mentioned above. ASLR, a process level technique, which provides protection against a wide-range of exploits because most exploits need to transfer control flow to code at a known address. By randomizing the positions of process memory sections, many exploits can be avoided most of the time, resulting in an exception being raised. Although ASLR makes it unlikely for an exploit to succeed, ASLR allows some probability that an exploit can still work after multiple trials. In order to address this, the example processes described herein provide a more fine-grained approach that may be used in conjunction or combination with ASLR. The example processes may be implemented to alter caller-callee conventions allowing detection when injected malware tries to call system functions incorrectly; create unique conventions per procedure caller-callee link set making it harder for malware to simply figure out the changed conventions; and make certain aspects of conventions dynamic. In this latter process, the stack frame addresses within a procedure and the storage regions within a procedure can be re-initialized for every program code restart.

The following section includes example analyses. While focusing on a binary-level approach, the example compiler techniques can be also adopted in source-level compilers, as well as tools that are able to manipulate source or binary codes.

Caller-Callee Link Set Analysis

A purpose of this analysis is to locate all possible sets of procedures that must share a specific caller-callee convention to function properly. Procedures that belong to different sets can in fact have different conventions—an observation that will be leveraged by the example processes described herein. Traditionally, the caller-callee convention for all procedures was fixed by the target architecture. Since in an implementation, the example processes randomize this convention both statically and dynamically, to some extent, the example processes ensure that the convention used by the callee is employed by all its callers.

This requirement translates into an analysis that iterates through all procedures in the control-flow graph noting all call in-edges or callers, and the associated basic blocks from which the calls occur. A unique interface convention can be then applied within each set. A link set will consider all caller(s)-callee groups that share a link to the callee.

Figure 8:
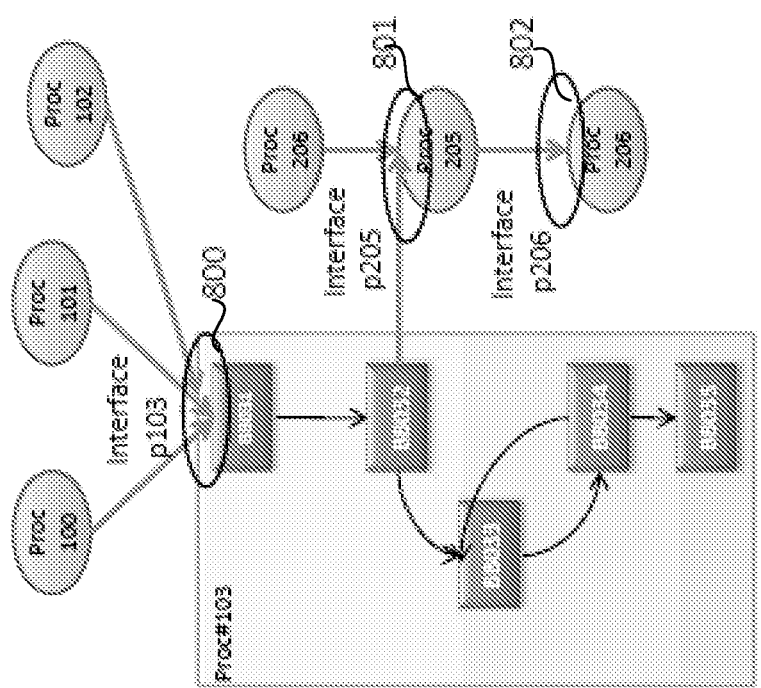
FIG. 8 is an example control flow graph with procedure calls and associated interfaces per caller-callee link set.

FIG. 8 shows an example control flow graph with procedure calls and highlights associated interfaces per caller-callee link set. In this example figure, there are three link sets and thus three associated interfaces. The interfaces are 800, 801, and 802. Within an interface the same convention is utilized. Each interface can be different from another.

Intra-Procedural Data-Flow Analysis for Memory Disambiguation

A purpose of this example process is to disambiguate the layout of stack utilization in order to be able to randomize the layout of memory utilization within a procedure. This example process can be based at the procedure-level, specifically focusing on stack utilization for input arguments, local variables, register spills, and returns. This example process can be implemented as a data-flow analysis. One example of a data-flow analysis that may be used is single state assignment (SSA). In some implementations, an analysis similar to point-to-graphs used in memory alias analysis can be used.

According to this example, the location set for a memory reference is defined as all possible locations (identified by address ranges) that the memory reference can point to at runtime. Whenever a proof cannot be completed statically, the example process assumes that a location set for a memory instruction is ambiguous and can point to any of the possible stack address locations at runtime. If the memory disambiguation process can provably determine that a memory access belongs to a location set not overlapping with a location set within the stack, it will not have implications due to stack utilization reordering. Additionally, since the processes are performed intra-procedural in this example (as opposed to a generic program-wide case), this approach may be easier to support in a compiler. In some example implementations, even if a procedure does have limitations in memory disambiguation, it will not affect the process' ability to analyze other procedures and make transformations to it.

Memory Utilization Randomization Transformations

Upon completion of the previous analyses, the compiler uses the information generated to transform the binary. Support for randomized memory utilization layouts specifically attributed to the randomization of the caller-callee conventions and intra-procedural stack/local storage allocations and utilization are among techniques that may be used.

An example transformation iterates through all caller-callee link sets and jitters the allocation of arguments to registers and the stack, while maintaining correctness within each set. The order of the arguments can also be uniquely chosen per set. This amounts to insertion of instructions to move arguments to specific registers and memory locations prior to each procedure call and also to retrieving these parameters in the callee procedure such that they can be operated upon. As a further extension, the example processes can separate the local storage into frames and manage the frames individually within a procedure instead of having one stack frame. During such choices, overhead considerations may be evaluated to reduce any added impact. Each compilation will typically result in a unique memory layout profile and caller-callee interface convention per link set. The example processes insert support into the binary to enable dynamic memory utilization inside a procedure. This enables the memory profile across reboots to be different in some implementations.

Dynamic behavior can be supported in different ways. A first example process alters the address ranges and start addresses allocated to local storage frames used for register spills and local variables. A further example process includes the insertion of support to dynamically jitter the caller-callee convention based on a random seed defined at startup. This also includes support in the callee procedure to decode the convention. This latter support can be selected on a per link set/procedure basis and may not have to be used across all procedures.

Autogenous Healing

In some implementations, the example VPC-specific healing processes are only activated upon detection of an attempt at exploitation or attack, resulting in a solution that may not incur performance overhead due to healing code executing during normal operation. Based on descriptions of both VPCs and an attacker's utilization of assumptions about computer code, it is evident that exploitations ultimately succeed due to a lack of constraining code in the computer code. In many cases, these constraints are not inserted due to code being shared across many disjoint call points (e.g., string copy, integer-to-string, memory copy, etc.). Additionally, their absence also relates back to the fact that the data that they will ultimately operate on is a result of the external system interactions and thus statically, cannot be reliably determined. Furthermore, many of these cases are complex and cannot be statically exactly pinpointed due to ambiguous control and data flow.

In some implementations, the VPC-based analysis is able to capture all (or substantially all) real vulnerabilities while not adding/including significant performance or storage overhead. This is because, in some implementations, healing is completed only at runtime on VPCs associated with an exploitation or attack attempt. The healing process includes a hybrid approach that spans compile-time and runtime to provide VPC-agnostic healing. The compiler support serves characterization and guidance roles. The VPC-agnostic healing templates are added at compile-time to the code, but are inserted at the appropriate location and updated at runtime to reflect the path and data utilized in an exploitation attempt. In an example, there may be few distinct templates that are used to reduce performance overhead. In some implementations, the templates may be added in place of the VPC (e.g., they may replace or overwrite the VPC). In some implementations, the templates are added at locations of the code that precede the VPC. In some implementations the templates are added at the VPS on the VPC-P path before the VPC.

Runtime Identification of Exploited VPC and Associated Path

In order to begin healing a VPC that has been the target of an attempt at exploitation or attack, the example processes are able to identify, at runtime, which VPC was the target of the attack and the path upon which the attack relied. For example, the VPC identified as being part of an actual attack at runtime may be a memory instruction that is determined to be performing an access that is outside of its predefined range. The information about the attack is used so that the proper healing template can be updated to reflect the specific attack methodology (as explained below). Upon detection of an exploitation attempt, control may be immediately transferred to an exception handler. As an operation in obtaining VPC information, the example processes insert procedure-level identification into the control-flow through the binary-level compiler. This information is able to identify the procedure that contained the VPC that was the target of exploitation or attack, as well as the procedure that was used to reach the VPC. In an example, the calling/caller procedure is the vulnerability point source (VPS), and may be used in a path-based VPS-driven healing approach instead of healing at the VPC. A variety of healing scenarios can be tailored to a particular use-case based on user requirements.

Healing Templates and Runtime Insertion of Adjusted Exploit-Tailored Codes for Healing In the example processes described herein, an operation performed in healing a vulnerability uses information regarding VPCs, their location, the target of the exploitation attempt, the path of the exploitation attempt, and data causing the undefined behavior to update a statically generating VPC-agnostic healing template. Since these healing templates are inserted beforehand into the code statically (by the compiler) to support an entire class of VPCs (e.g., buffer overflows, format strings, etc.), the healing templates may be updated in an exploitation/attack-specific manner at runtime.

FIG. 9 shows example of components of header information for an example VPC healing template. This figure identifies types of information required to perform healing in this example implementation. This information is a combination of statically-identified information that is passed down to runtime as well as runtime generated, exploit-specific data. In this example, the information contained in this structure is generated at runtime by the IDH during the VPC-path identification tracing and directly used in creating exploitation/attack-tailored healing code for a healing template.

In an example, healing a vulnerability includes, among other things, limiting the VPC instructions ability to access memory. Other kinds of vulnerabilities, rather than accessing an unwanted address, yield an unwanted payload to a VPC. The example processes also heal this type of vulnerability. When limiting the VPC's memory access, the boundary that caused the vulnerability is recorded (e.g., stored in memory). For example, a vulnerability may be a memory access for the VPC having a range/size, or other characteristic (s), that deviates from, or exceeds, a designated range/size of the memory access predefined (e.g., at a VPO) for that VPC. A boundary associated with that memory access for the VPC may be recorded. The healing template, in this example, adjusts the boundary or payload on the VPC-P path, thereby preventing occurrence of an actual exploitation/attack.

Although the foregoing focuses on an example VPC-targeted (e.g., residing at the VPC) healing approach, VPS-targeted (e.g., residing at the VPS) healing templates may also be used, as they may be more efficient for certain classes of vulnerabilities. In that case the healing code records the payload for the VPC that was used before the detection and constraining code avoids that payload occurring. A combination can also be employed, in which some vulnerabilities are healed at VPS addresses.

Referring to FIG. 10, the example healing template may be comprised of two distinct code parts. The first phase is the healing initialization phase that sets up the generic healing based on parameters available for the current VPC. A branch instruction replaces (i.e., overwrites) the VPC in this example. In particular, the healing template includes replacing the VPC with a branch to template setup argument code, using the template header extracted at runtime to initialize template arguments, and call generic template constraining code.

The second part of the example healing template is the boundary check code limiting the memory to be written during the exploit. This code enforces the actual boundary for the VPS that called the VPC containing procedure. Checking the induction variable against the boundary that was set up in the initialization code performs this operation. Once the boundary condition is reached, the healed code branches out of the loop instead of allowing the store instruction to execute, thereby preventing the vulnerability point from being reached and, as a result, ensuring that an exploitation attempt will not succeed. In this example, so that the healing template, when adopted, does not require any changes in register allocation, instructions to save and restore CPU state at the beginning and end of the boundary check code are used. This ensures that the execution of the new code will remain transparent to the original code and that it is insertable at runtime, not affecting other functionality. The boundary conditions for the healing are completed in the IDH. A new condition may be a result of adjusting the condition that allowed the exception during an attack. This involved adjusting the condition for a specific VPC based on indirectly adjusting the induction variable boundaries. In this example healing occurs because of the interplay between the information tracked right before an attack as well as the information extracted during the attack in the IDH. The healing code may constrain the VPC based on the correlation between the two. No healing needs to be taken place unless a detection is running and the IDH is executing after an exception that is a result of an attack.

In the example of FIG. 10, the second part of the healing template (the constraining part) includes checking the boundary on a current VPC-P path, and branching to an instruction post-VPC. The boundary check includes adjusting the boundary to avoid attack, predicating access to memory at the adjusted boundary, and executing the VPC if it is within the adjusted boundary.

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks. Machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

Each computing device, such as a tablet computer, may include a hard drive for storing data and computer programs, and a processing device (e.g., a microprocessor) and memory (e.g., RAM) for executing computer programs. Each computing device may include an image capture device, such as a still camera or video camera. The image capture device may be built-in or simply accessible to the computing device.

Each computing device may include a graphics system, including a display screen. A display screen, such as an LCD or a CRT (Cathode Ray Tube) displays, to a user, images that are generated by the graphics system of the computing device. As is well known, display on a computer display (e.g., a monitor) physically transforms the computer display. For example, if the computer display is LCD-based, the orientation of liquid crystals can be changed by the application of biasing voltages in a physical transformation that is visually apparent to the user. As another example, if the computer display is a CRT, the state of a fluorescent screen can be changed by the impact of electrons in a physical transformation that is also visually apparent.

Elements of different embodiments described herein may be combined to form other embodiments not specifically set forth above. Elements may be left out of the processes, computer programs, etc. described herein without adversely affecting their operation. Furthermore, various separate elements may be combined into one or more individual elements to perform the functions described herein.

Other implementations not specifically described herein are also within the scope of the following claims.

What is claimed is:

1. A method comprising:
   at compile-time:
      identifying, by one or more processing devices, candidate code in executable code based on a static analysis of the executable code, the candidate code comprising code that is vulnerable to attack or the candidate code being on a path to code that is vulnerable to attack, where information related to the attack is based, at least in part, on the candidate code; and
      inserting a healing template into the executable code, the healing template being based on the information and comprising a generic template for addressing an attack associated with the candidate code;
   at run-time:
      identifying attack-related information, the attack-related information comprising information about an attempted attack associated with the candidate code; and
      customizing, by one or more processing devices, the healing template to produce a customized healing template based on the attack-related information, the customized healing template comprising code that is executable to inhibit the attempted attack.

2. The method of claim 1, wherein the executable code comprises binary code generated from application code by a compiler executed by one or more processing devices.

3. The method of claim 1, wherein the candidate code comprises a vulnerability point candidate (VPC), the VPC comprising code in the executable code that is targeted for attack.

4. The method of claim 1, wherein the candidate code comprises a vulnerability point source (VPS), the VPS comprising, and being part of, a source of the path to code targeted for attack.

5. The method of claim 1; wherein the static analysis comprises:
   performing, by one or more processing devices, a static call-graph analysis to identify unique procedure caller-callee sets in the executable code; and
   modifying, by one or more processing devices, how a stack is organized inside a procedure of the executable code.

6. The method of claim 1, wherein the code for the customized healing template is not executable in a case that an attack does not occur.

7. The method of claim 1, wherein identifying comprises identifying multiple instances of candidate code; and
   wherein the method further comprises:
      determining, by one or more processing devices, which of the instances of candidate code was actually subjected to attack at run-time; and
      customizing, by one or more processing devices, the healing template at run-time for each instance of candidate code was actually subjected to attack.

8. The method of claim 1, wherein the template is inserted into executable code to replace the candidate code.

9. The method of claim 1, wherein the template is inserted into executable code at a point immediately prior to the candidate code.

10. The method of claim 1, wherein identifying the candidate code comprises identifying points within the executable code that are vulnerable to attack.

11. The method of claim 10, wherein identifying the points comprises:
    identifying, by one or more processing devices, memory store instructions that are in a program loop in the executable code and that operate on induction variables; and
    classifying, by one or more processing devices, at least some of the memory store instructions as points within the executable code that are vulnerable to attack.

12. The method of claim 11, further comprising filtering, by one or more processing devices; the memory store instructions to produce the at least some memory store instructions, the at least some memory store instructions being less than all memory store instructions.

13. The method of claim 12, wherein filtering comprises excluding at least some memory store instructions.

14. The method of claim 1, wherein identifying the candidate code comprises determining, by one or more processing devices, an offset from a memory address associated with the candidate code to create a boundary, an identity of the boundary being part of the information.

15. The method of claim 14, wherein determining comprises:
    storing, by one or more processing devices, a first value corresponding to an address that is prior to a loop containing the candidate code; and
    storing, by the one or more processing devices, a second value corresponding to an address that is immediately prior to the candidate code that is vulnerable to attack.

16. A system comprising:
    one or processing devices; and
    one or more non-transitory machine-readable storage devices storing instructions that are executable, the instructions comprising:
    a compiler that is executable by the one or more processing devices to perform operations comprising:
       identifying, by one or more processing devices, candidate code in executable code based on a static analysis of the executable code, the candidate code comprising code that is vulnerable to attack or the candidate code being on a path to code that is vulnerable to attack, where information related to the attack is based, at least in part, on the candidate code; and
       inserting a healing template into the executable code, the healing template being based on the information and comprising a generic template for addressing an attack associated with the candidate code;
    run-time code that is executable by the one or more processing devices to perform operations comprising:
       identifying attack-related information, the attack-related information comprising information about an attempted attack associated with the candidate code; and
       customizing, by one or more processing devices, the healing template to produce a customized healing template based on the attack-related information, the customized healing template comprising code that is executable to inhibit the attempted attack.

17. The system of claim 16, wherein the static analysis comprises:
   performing a static call-graph analysis to identify unique procedure caller-caller: sets in the executable code; and
   modifying how a stack is organized inside a procedure of the executable code.

18. The system of claim 16, wherein identifying the candidate code comprises identifying points within the executable code that are vulnerable to attack.

19. The system of claim 18, wherein identifying the points comprises:
   identifying memory store instructions that are in a program loop in the executable code and that operate on induction variables; and
   classifying at least some of the memory store instructions as points within the executable code that are vulnerable to attack.

20. The system of claim 19, wherein the complier is configured to filter the memory store instructions to produce the at least some memory store instructions, the at least some memory store instructions being less than all memory store instructions.

21. The system of claim 20, wherein filtering comprises excluding at least some memory store instructions.

* * * * *